United States Patent
Kawada et al.

(10) Patent No.: US 11,148,241 B2
(45) Date of Patent: Oct. 19, 2021

(54) MAIN SHAFT DEVICE (71) Applicant: MAKINO MILLING MACHINE CO., LTD., Tokyo (JP)

(72) Inventors: Takeshi Kawada, Aiko-gun (JP); Teppei Nebuka, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 144 days.

(21) Appl. No.: 16/498,702

(22) PCT Filed: Mar. 30, 2017

(86) PCT No.: PCT/JP2017/013401
§ 371 (c)(1),
(2) Date: Sep. 27, 2019

(87) PCT Pub. No.: WO2018/179280
PCT Pub. Date: Oct. 4, 2018

(65) Prior Publication Data
US 2021/0101234 A1  Apr. 8, 2021

(51) Int. Cl.
*F16C 19/52* (2006.01)
*F16C 33/66* (2006.01)
(Continued)

(52) U.S. Cl.
CPC .............. *B23Q 1/70* (2013.01); *F16C 19/525* (2013.01); *F16C 33/66* (2013.01); *F16C 37/007* (2013.01);
(Continued)

(58) Field of Classification Search
CPC ...... F16C 19/525; F16C 33/66; F16C 35/042; F16C 35/12; F16C 37/007; F16C 2202/22;
(Continued)

(56) References Cited

U.S. PATENT DOCUMENTS 2,523,983 A * 9/1950 Arms ................... H02K 5/1732
384/535
2,538,229 A * 1/1951 Boden ..................... F16C 27/04
384/611
(Continued)

FOREIGN PATENT DOCUMENTS

CN  104889424 A  *  9/2015
DE  10027750 A1  *  12/2001  ............. H02K 15/16
(Continued)

OTHER PUBLICATIONS

International Search Report dated Jul. 4, 2017, directed to International Application No. PCT/JP2017/013401; 2 pages.

*Primary Examiner* — Marcus Charles
(74) *Attorney, Agent, or Firm* — Morrison & Foerster LLP (57) ABSTRACT

A main shaft device is attached to a work machine. The main shaft device is provided with a main shaft that supports a tool or a workpiece, and a main shaft motor that causes the main shaft to rotate. The main shaft device is provided with bearings that are rolling bearings which support the main shaft in an inner race, and a housing and a rear housing that secure an outer race of the bearings. The housing and the rear housing are formed of a material having a coefficient of thermal expansion greater than that of the main shaft.

2 Claims, 4 Drawing Sheets (51) Int. Cl.
*F16C 25/04* (2006.01)
*F16C 35/12* (2006.01)
*F16C 37/00* (2006.01)
*B23Q 1/70* (2006.01)
*B23Q 11/12* (2006.01)
*F16C 35/04* (2006.01)

(52) U.S. Cl.
CPC .......... *B23Q 11/123* (2013.01); *B23Q 11/127* (2013.01); *F16C 35/042* (2013.01); *F16C 35/12* (2013.01); *F16C 2202/22* (2013.01); *F16C 2233/00* (2013.01); *F16C 2322/39* (2013.01)

(58) Field of Classification Search
CPC .... F16C 2233/00; F16C 2322/39; B23Q 1/70; B23Q 1/72; B23Q 3/105; B23Q 11/123; B23Q 11/127
USPC ................ 384/321–322, 467, 474, 900, 476; 409/135, 231
See application file for complete search history.

(56) References Cited

U.S. PATENT DOCUMENTS

| | | | | |
|---|---|---|---|---|
| 3,947,079 | A | | 3/1976 | Anderson |
| 4,076,191 | A | * | 2/1978 | Binge ................ B64G 1/443 136/292 |
| 4,560,289 | A | * | 12/1985 | Wood, III ............ B23Q 1/70 384/535 |
| 6,913,390 | B2 | * | 7/2005 | Inoue .................. B23Q 1/40 384/321 |
| 2001/0003546 | A1 | * | 6/2001 | Watanabe ............ F16C 25/06 384/517 |
| 2004/0013335 | A1 | | 1/2004 | Inoue et al. |
| 2006/0239598 | A1 | * | 10/2006 | Matsuyama ........ B23Q 11/123 384/462 |

FOREIGN PATENT DOCUMENTS

| | | | | | |
|---|---|---|---|---|---|
| EP | 0298509 | A1 | * | 1/1989 | ........... F16C 35/061 |
| JP | H4-87704 | | | 3/1992 | |
| JP | 04161033 | A | * | 6/1992 | ........... F16C 27/04 |
| JP | 2003-56582 | | | 2/2003 | |
| JP | 2008041118 | A | * | 2/2008 | ........... G11B 33/144 |
| JP | 2010-23158 | A | | 2/2010 | |
| KR | 20170082801 | A | * | 7/2017 | |
| WO | WO-2005092565 | A1 | * | 10/2005 | ........... B23Q 11/122 |
| WO | WO-2011110476 | A1 | * | 9/2011 | ........... B23Q 11/127 |
| WO | WO-2013123659 | A1 | * | 8/2013 | ........... F16C 33/767 |
| WO | WO-2016128515 | A1 | * | 8/2016 | ........... B23Q 1/0027 |
| WO | WO-2018073213 | A1 | * | 4/2018 | ............... B23Q 1/70 |

* cited by examiner

MAIN SHAFT DEVICE

CROSS-REFERENCE TO RELATED APPLICATIONS

This application is a U.S. national phase patent application of International Patent Application No. PCT/JP2017/013401, filed Mar. 30, 2017, which is hereby incorporated by reference in the present disclosure in its entirety.

FIELD OF THE INVENTION

The present invention relates to a spindle device attached to a machine tool.

BACKGROUND OF THE INVENTION

A machine tool is provided with a spindle device that rotates a tool or a workpiece. For example, if the machine tool is provided with the spindle device that rotates the tool, the machine tool can rotate the tool about an axis. The machine tool can machine the workpiece into a desired shape by bringing the tool into contact with the workpiece and moving the tool relative to the workpiece. The spindle device includes a spindle to which a tool is connected. The spindle is supported by a housing via bearings. The rotation of the spindle causes the tool or workpiece to rotate.

In machine tools, a tool or a workpiece may be rotated at high speed depending on the type of cutting. In a spindle device in which the spindle rotates at high speed, rolling bearings can be adopted as bearings for supporting the spindle.

Japanese Laid-Open Patent Publication No. 2003-056582A discloses a rotary shaft device provided with a coolant passage of a shaft center and a coolant passage of a housing. This rotary shaft device controls the temperature of a coolant supplied to the coolant passage of the shaft center and the coolant passage of the housing and expands the outer ring of the bearing slightly more than the inner ring of the bearing.

PATENT LITERATURE

Patent literature 1: Japanese Laid-open Patent Publication No. 2003-056582A

SUMMARY OF THE INVENTION

In a spindle device provided with rolling bearings, a predetermined pressure is applied to each rolling bearing in the radial direction of the spindle. That is, the spindle device is assembled such that a preload is applied to each rolling bearing. Desired rolling bearing characteristics can be obtained by the preload applied to the rolling bearings. The range of magnitudes of a proper preload is predetermined.

When the spindle device is driven so at to rotate the spindle, the temperature of the rolling bearing increases due to the friction between rolling elements and the inner ring of the rolling bearing and the friction between the rolling elements and the outer ring. Even if the spindle and the housing are made of the same material, they have different heat capacities because of their different volumes. The spindle having the volume which is smaller than that of the housing tends to increase in temperature due to its small heat capacity. On the other hand, the housing having the volume which is larger than that of the spindle is unlikely to increase in temperature due to its large heat capacity. Thus, the expansion amount of the spindle is larger than the expansion amount of the housing. In particular, the expansion amount of the spindle in the radial direction is larger than the expansion amount of the housing in the radial direction. Thus, when the spindle rotates, the pressure applied to the bearings increases. The higher the rotational speed of the spindle, the higher the temperature of the bearings. Thus, when the spindle rotates at high speed, the pressure acting on the bearings increases.

In addition, since the inner ring of the bearing rotate with the spindle, a centrifugal force acts on the inner ring. Furthermore, the centrifugal force also acts on the rolling elements rotating around the inner ring. The centrifugal force acting on the inner ring and the rolling elements increases the pressure acting on the bearing. In particular, when the spindle rotates at high speed, the pressure acting on the bearing increases.

Thus, when the pressure applied to the bearing is increased due to the rotation of the spindle, the life of the bearing may be shortened, or the bearing may be damaged. In particular, when the spindle rotates at high speed, the life of the bearing may be shortened or the bearing may be damaged.

An object of the present invention is to provide a spindle device that suppresses a pressure applied to the rolling bearing during an operation period.

A spindle device according to the present invention is attached to a machine tool and rotates a tool or a workpiece. The spindle device includes a spindle for supporting a tool or a workpiece, and a spindle motor for rotating the spindle. The spindle device includes a rolling bearing which has an inner ring, rolling elements, and an outer ring and supports the spindle with the inner ring, and a bearing support part that secures the outer ring of the rolling bearing. The bearing support part is formed of a material having a thermal expansion coefficient larger than that of the spindle.

In the above-described invention, the spindle device can include a first coolant supply device that supplies a first coolant to the bearing support part. The bearing support part can have a first flow path through which the first coolant flows. The first flow path can be disposed on the side of the outer ring of the rolling bearing. The first coolant supply device can have a function of adjusting the temperature of the first coolant and supply the first coolant to the first flow path.

In the above-described invention, the spindle device can include a controller that controls the first coolant supply device. The controller can implement a first temperature control for controlling the temperature of the first coolant. The first temperature control can include a control in which the temperature of the first coolant increases as the rotational speed of the spindle motor increases.

In the above-described invention, the spindle device can include a second coolant supply device that supplies a second coolant to the spindle. The spindle can have a second flow path through which the second coolant flows. The second flow path can be disposed on the side of the inner ring of the rolling bearing. The second coolant supply device can have a function of adjusting the temperature of the second coolant and supply the second coolant to the second flow path.

In the above-described invention, the spindle device can include a controller that controls the second coolant supply device. The controller can implement a second temperature control for controlling the temperature of the second coolant. The second temperature control can include a control in which the temperature of the second coolant decreases as the rotational speed of the spindle motor increases.

According to the present invention, a spindle device that suppresses the pressure applied to the rolling bearing during an operation period can be provided.

DETAILED DESCRIPTION OF THE INVENTION

The spindle device in an embodiment will be described with reference to FIGS. 1 to 5. The spindle device of the present embodiment is attached to a machine tool. The machine tool of the present embodiment is a numerically controlled machine tool that automatically performs a machining operation by relatively moving a tool and a workpiece based on a machining program.

Figure 1:
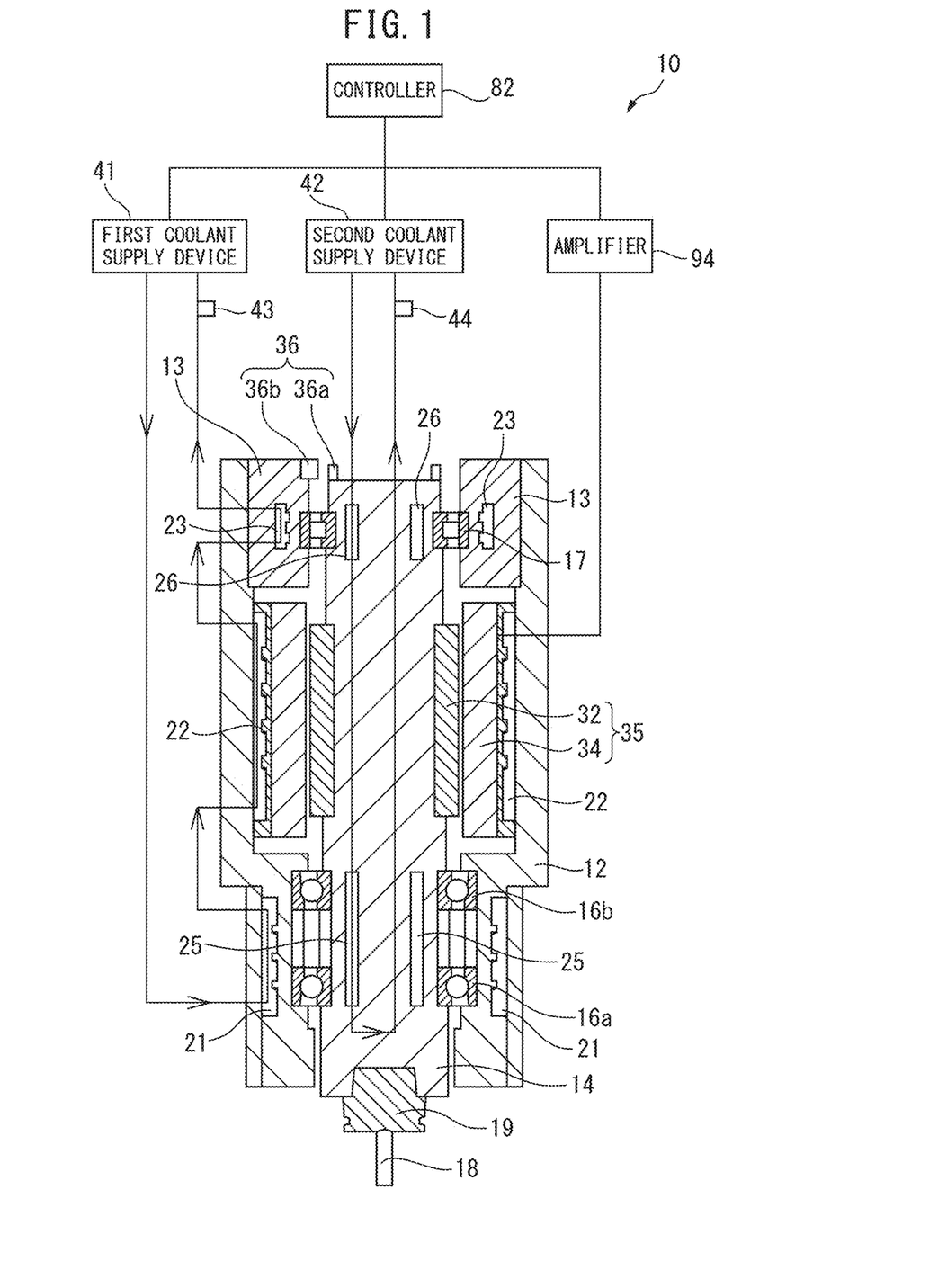
FIG. 1 is a schematic sectional view of a spindle device according to an embodiment.

FIG. 1 is a schematic sectional view of the spindle device of the present embodiment. In the present embodiment, the direction in which the tool 18 is disposed is referred to as the front side of the spindle device 10, and the side opposite to the side in which the tool 18 is disposed is referred to as the rear side. The spindle device 10 includes a hollow housing 12 and a spindle 14 supported by the housing 12. The spindle 14 is formed in a cylindrical shape. The spindle 14 supports the tool 18 via a tool holder 19. The spindle 14 is rotatably supported via bearings 16a and 16b as front bearings and a bearing 17 as a rear bearing. The bearings 16a, 16b, and 17 of the present embodiment are rolling bearings. Each bearing includes an inner ring, an outer ring, and rolling elements disposed between the inner ring and the outer ring. The inner rings of the bearings 16a, 16b, and 17 support the spindle 14.

The spindle device 10 includes a bearing support part that secures the outer rings of the bearings 16a, 16b, and 17. The outer rings of the bearings 16a and 16b are secured to the inner surface of the housing 12. The portion of the housing 12, which is in contact with the bearings 16a and 16b, functions as a bearing support part. Further, the spindle device 10 includes a rear housing 13 secured to the inner surface of the housing 12. The rear housing 13 supports the bearing 17. The outer ring of the bearing 17 is secured to the rear housing 13. The rear housing 13 functions as a bearing support part.

The spindle device 10 includes a spindle motor 35 that rotates the spindle 14. The spindle motor 35 in the present embodiment is a built-in type motor. The spindle motor 35 includes a rotor 32 secured to the outer surface of the spindle 14 and a stator 34 secured to the inner surface of the housing 12. The spindle device 10 includes an amplifier 94 serving as an electric-supply device that supplies electricity to the spindle motor 35.

Inside the spindle 14, a mechanism for holding and releasing the tool holder 19 is disposed. During machining of a workpiece, the spindle 14 holds the tool 18 via the tool holder 19. The tool 18 rotates with the spindle 14 by driving the spindle motor 35.

The spindle device 10 includes an encoder 36 serving as a rotation angle detector for detecting the rotational speed of the spindle 14. The encoder 36 of the present embodiment includes a gear 36a and an encoder center 36b. The gear 36a of the present embodiment is disposed at the rear end part of the spindle 14. The encoder center 36b is secured to the rear housing 13 so as to face the gear 36a.

The spindle device 10 of the present embodiment is formed so as to cool the bearings 16a, 16b, and 17 with a coolant. Cooling water or cooling oil can be used as the coolant.

The housing 12 has first flow paths 21 and 23 through which a first coolant flows. The flow path 21 is formed so as to correspond to the positions of the bearings 16a and 16b. The flow path 21 is disposed on the side of the bearings 16a and 16b. The flow path 21 is formed in the vicinity of the bearings 16a and 16b. The flow path 21 of the present embodiment is formed so as to surround the bearings 16a and 16b. The rear housing 13 has a first flow path 23 through which the first coolant flows. The flow path 23 is formed so as to correspond to the position of the bearing 17. The flow path 23 is disposed on the side of the bearing 17. The flow path 23 is formed in the vicinity of the bearing 17. The flow path 23 of the present embodiment is formed so as to surround the bearing 17.

Further, the first coolant of the present embodiment is formed so as to cool the spindle motor 35. A first flow path 22 through which the first coolant flows is formed between the housing 12 and a member that supports the stator 34.

The spindle 14 includes second flow paths 25 and 26 through which a second coolant flows. The flow path 25 is formed so as to correspond to the positions of the bearings 16a and 16b. The flow path 25 is disposed on the side of the bearings 16a and 16b. The flow path 25 is formed in the vicinity of the bearings 16a and 16b. The flow path 26 is formed so as to correspond to the position of the bearing 17. The flow path 26 is disposed at the side of the bearing 17. The flow path 26 is formed in the vicinity of the bearing 17.

The spindle device 10 includes a first coolant supply device 41 that supplies the first coolant to the bearing support part. The first coolant supply device 41 supplies the first coolant to the first flow paths 21, 22 and 23 formed in the housing 12 and the rear housing 13. The first coolant supply device 41 is formed so as to be able to adjust the temperature of the first coolant. The first coolant supply device 41 of the present embodiment includes a pump for supplying a coolant, a chiller unit for cooling the coolant, and a heater for heating the coolant. The chiller unit includes a compressor, an expansion valve, and a heat exchanger. A first temperature sensor 43 is disposed in the middle of a flow path returning from the first flow path 23 to the first coolant supply device 41. The first temperature sensor 43 detects the temperature of the coolant after the housing 12 and the rear housing 13 are cooled.

The bearings 16a and 16b are cooled by the first coolant supplied to the first flow path 21. The bearing 17 is cooled by the first coolant supplied to the first flow path 23. Further, the spindle motor 35 is cooled by the first coolant supplied to the first flow path 22. Note that a coolant may be supplied from another coolant supply device to the first flow path 22 for cooling the spindle motor 35. That is, the device for cooling the spindle motor 35 may be formed separately from the device for cooling the bearings.

The spindle device 10 includes a second coolant supply device 42 that supplies the second coolant to the spindle 14. The second coolant supply device 42 supplies the second coolant to the second flow paths 25 and 26 formed in the spindle 14. The second coolant supply device 42 is formed so as to adjust the temperature of the second coolant. The second coolant supply device 42 of the present embodiment includes a pump for supplying a coolant, and a chiller unit for cooling the coolant in the same way as first coolant supply device 41. A second temperature sensor 44 is disposed in the middle of a flow path returning from the second flow path 25 to the second coolant supply device 42. The second temperature sensor 44 detects the temperature of the coolant after the spindle 14 is cooled.

The temperature sensors 43 and 44 of the present embodiment are formed so as to detect the temperature of the coolant after the spindle 14, the housing 12, and the rear housing 13 are cooled. However, the present invention is not limited to this embodiment. The temperature sensors can be disposed at any positions where the temperature of the coolant can be detected. For example, the temperature sensors may be arranged so as to detect the temperature of the coolant flowing out of the coolant supply devices 41 and 42. Alternatively, the temperature sensors may be arranged so as to detect the temperature of the coolant flowing through the respective flow paths 21, 22, 23, 25, and 26.

Figure 2:
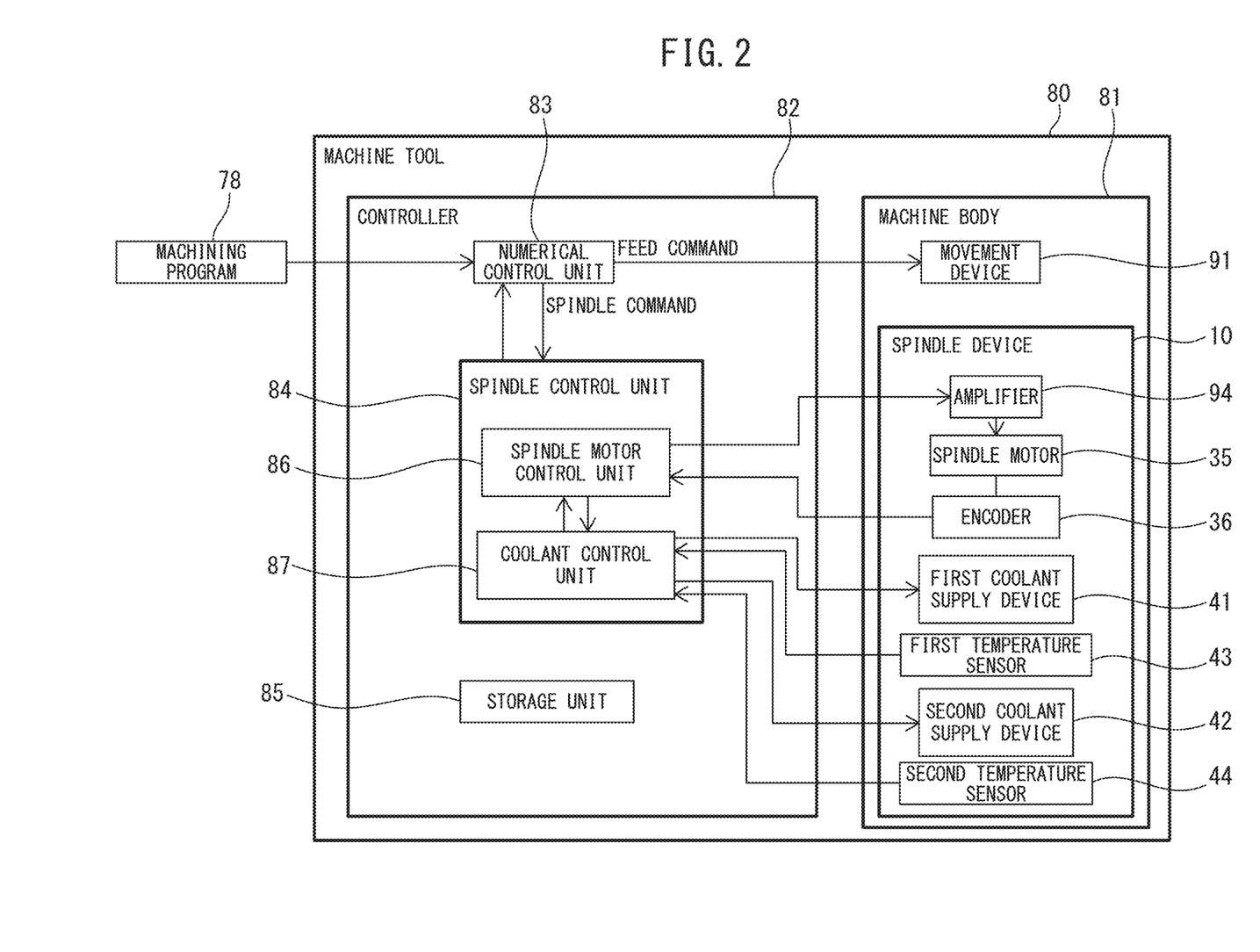
FIG. 2 is a block diagram of a machine tool according to the embodiment.

FIG. 2 is a block diagram of the machine tool according to the present embodiment. Referring to FIGS. 1 and 2, the machine tool 80 includes a machine body 81 and a controller 82. The machine body 81 includes the spindle device 10 and a movement device 91 for moving the tool 18 relative to a workpiece. In the machine body 81, for example, an X axis, a Y axis, and a Z axis, which are orthogonal to one another, are set as linear feed axes. The movement device 91 includes a device for moving a tool in the X-axis direction and a device for moving the tool in the Y-axis direction. In addition, the movement device 91 includes a device for moving a table, to which the workpiece is secured, in the Z-axis direction. The movement device 91 is not limited to this embodiment, and any device that moves the tool relative to the workpiece can be adopted.

The controller 82 is configured by, for example, a digital computer including a central processing unit (CPU), a random access memory (RAM), a read only memory (ROM), etc., which are connected to one another via a bus line. A machining program 78, in which a procedure for machining a workpiece is set, is input to the machine tool 80. The controller 82 controls the machine body 81 based on the machining program 78.

The controller 82 includes a numerical control unit 83. The numerical control unit 83 transmits feed commands regarding the feed axes to the movement device 91 based on the machining program 78. The movement device 91 moves the tool 18 relative to the workpiece based on the feed commands. The controller 82 includes a spindle control unit 84 for controlling the spindle device 10. The numerical control unit 83 transmits a spindle command for controlling the spindle to the spindle control unit 84 based on the machining program 78. In the machining program 78, the rotational speed of the spindle motor 35 is set. The spindle command includes, for example, a command regarding to the rotational speed of the spindle motor 35 and a command regarding to the flow rate and temperature of the coolant.

The spindle control unit 84 controls the spindle device 10 based on the spindle command. The spindle control unit 84 includes a spindle motor control unit 86 that controls the spindle motor 35. The spindle motor control unit 86 transmits an operation command for the spindle motor 35 to the amplifier 94 based on the spindle command. The operation command for the spindle motor 35 includes the rotational speed of the spindle motor 35. The amplifier 94 supplies electricity to the spindle motor 35 based on the operation command for the spindle motor. The spindle 14 is rotated by driving the spindle motor 35. The rotational speed of the spindle 14 is detected by an encoder 36. The output of the encoder 36 is transmitted to the spindle motor control unit 86. The spindle motor control unit 86 can correct the operation command for the spindle motor 35 based on the output of the encoder 36.

The spindle control unit 84 includes a coolant control unit 87 that controls the coolant supply devices 41 and 42. The coolant control unit 87 transmits an operation command to the first coolant supply device 41 and the second coolant supply device 42. Further, the coolant control unit 87 acquires the temperature of the first coolant from the first temperature sensor 43. The coolant control unit 87 acquires the temperature of the second coolant from the second temperature sensor 44.

The coolant control unit 87 acquires the rotational speed of the spindle motor 35 (rotational speed of the spindle 14) from the spindle motor control unit 86. The coolant control unit 87 controls the first coolant supply device 41 and the second coolant supply device 42 so that the temperature of the coolant varies so as to correspond to the rotational speed of the spindle motor 35. For example, when the temperature of the coolant acquired from the temperature sensors 43 and 44 is higher than a predetermined target temperature, the coolant control unit 87 controls the coolant supply devices 41 and 42 so as to reduce the temperature of the coolant.

The controller 82 includes a storage unit 85 that stores information on the machine tool 80. For example, the storage unit 85 stores the machining program 78, the target temperature of the coolant, and the target flow rate of the coolant. In particular, the storage unit 85 stores the target temperature of the first coolant and the target temperature of the second coolant, which correspond to the rotational speed of the spindle motor 35. The relationship between the rotational speed of the spindle motor 35 and the target temperature of the coolant is predetermined by a formula. The storage unit 85 stores this formula. Alternatively, the relationship between the rotational speed of the spindle motor 35 and the target temperature of the coolant may be predetermined in the correspondence table. The storage unit 85 may store this correspondence table.

Referring to FIG. 1, the bearing support part of the spindle device 10 of the present embodiment is formed of a material having a thermal expansion coefficient larger than that of the spindle 14. In the present embodiment, the thermal expansion coefficient of the housing 12 is larger than the thermal expansion coefficient of the spindle 14. Further, the thermal expansion coefficient of the rear housing 13 is larger than the thermal expansion coefficient of the spindle 14. In the present embodiment, the spindle 14 is formed of carbon steel, and the housing 12 and the rear housing 13 are formed of an aluminum alloy. The material of the spindle 14 and the material of the bearing support part are not limited to this embodiment. Any materials, in which the thermal expansion coefficient of the bearing support part is larger than the thermal expansion coefficient of the spindle, can be adopted. For example, carbon fiber reinforced plastic (CFRP) can be adopted as the material of the spindle, and an aluminum alloy can be adopted as the material of the housing.

Figure 3:
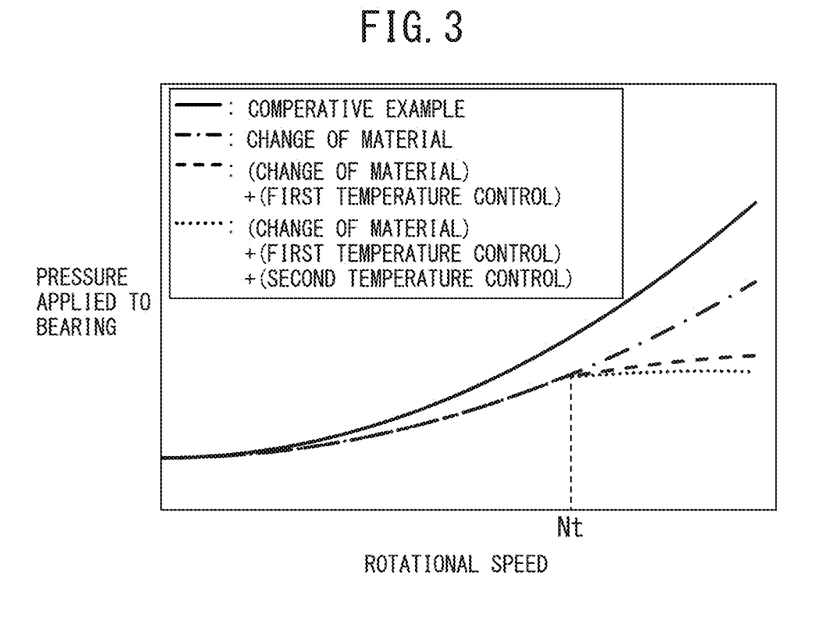
FIG. 3 is a graph showing the relationship between a rotational speed of a spindle motor and a pressure applied to rolling bearing in the embodiment.

FIG. 3 shows a graph of the relationship between the rotational speed of the spindle and the pressure applied to the bearings during operation. Here, the pressure applied to the bearings 16a and 16b as front bearings is illustrated as an example, but the pressure applied to the bearing 17 as a rear bearing has a similar tendency. The spindle device 10 is assembled so that a predetermined pressure (preload) is applied to the rolling bearings. When the spindle device 10 is at rest, a pressure is applied to the rolling bearings.

FIG. 3 shows a graph of a spindle device of a comparative example in which the material of the spindle and the material of the bearing support part are the same. In the spindle device of the comparative example, for example, the spindle, the housing, and the rear housing are formed of carbon steel. The spindle device of the comparative example includes a first coolant supply device and a second coolant supply device.

Figure 4:
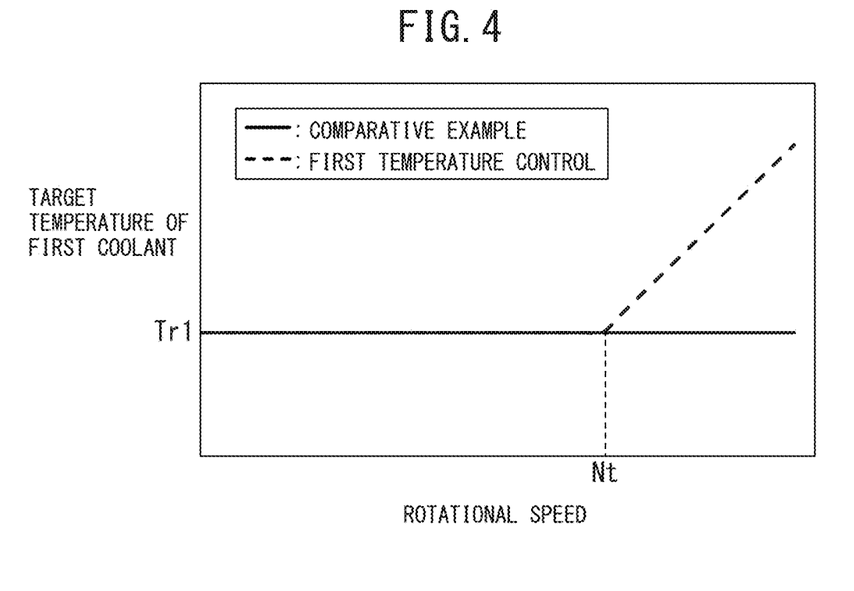
FIG. 4 is a graph showing the relationship between the rotational speed of the spindle motor and a target temperature of a first coolant in the embodiment.
Figure 5:
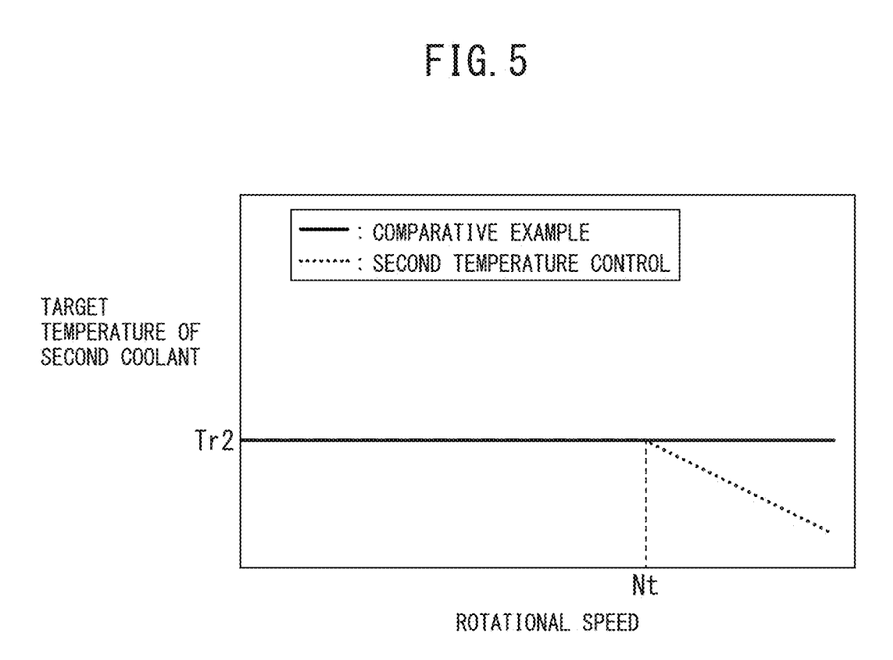
FIG. 5 is a graph showing the relationship between the rotational speed of the spindle motor and a target temperature of a second coolant in the embodiment.

FIG. 4 shows a graph of the target temperature of the first coolant. FIG. 5 shows a graph of the target temperature of the second coolant. In the graphs shown in FIGS. 4 and 5, the horizontal axis indicates the rotational speed of the spindle motor 35, and the vertical axis indicates the target temperature of the coolant. The target temperature of the coolant in the graphs corresponds to the target temperature stored in the storage unit 85 of the controller 82.

Referring to FIG. 4, in the spindle device of the comparative example, the first coolant supply device 41 is controlled so that the temperature of the first coolant remains constant regardless of the rotational speed. Referring to FIG. 5, in the spindle device of the comparative example, the second coolant supply device 42 is controlled so that the temperature of the second coolant remains constant regardless of the rotational speed. In the present embodiment, such a constant temperature is referred to as a reference temperature Tr. As the reference temperature Tr, for example, the temperature of a room in which the machine tool is disposed, the temperature of the bed of the machine tool, etc. can be employed. The reference temperature Tr of the first coolant supply device 41 and the reference temperature Tr of the second coolant supply device 42 may have the same value or different values. Hereinafter, the reference temperature of the first coolant supply device 41 is denoted by Tr1, and the reference temperature of the second coolant supply device 42 is denoted by Tr2.

When the spindle rotates, the temperature of the bearings increases due to the friction between the inner ring and the rolling elements of the bearing and the friction between the outer ring and the rolling elements. Referring to FIG. 3, in the spindle device of the comparative example, the temperature of the first coolant and the temperature of the second coolant are maintained constant. However, the flow paths 21, 23, 25, and 26 of the coolant are separated from the bearings 16a, 16b, and 17. This causes a difference between the temperature of the coolant and the temperature of the bearings 16a, 16b, and 17. When the rotational speed of the spindle motor 35 increases, the temperature of the bearings 16a, 16b, and 17 increases. Furthermore, when the spindle 14 rotates, a centrifugal force in a direction toward the outside acts on the inner rings of the bearings 16a, 16b, and 17. Since the outer rings are secured, the pressure applied to the bearings 16a, 16b, and 17 increases as the rotational speed of the spindle motor 35 increases.

Thus, as the rotational speed of the spindle motor 35 increases, the temperature of the bearings 16a, 16b, and 17 increases and the amount of expansion increases. Further, as the rotational speed of the spindle 14 increases, the centrifugal force increases. Thus, the pressure applied to the bearings 16a, 16b, and 17 increases as the rotational speed of the spindle motor 35 increases.

In particular, in the spindle device 10 of the present embodiment and the spindle device of the comparative example, the spindle rotates at high speed. As a high rotational speed, 20,000 rpm or more can be illustrated, for example. In the spindle device of the comparative example, the increase in pressure applied to the bearings is large in the high-speed range.

FIG. 3 shows an embodiment of a spindle device in which the material is changed from the comparative example. In this spindle device, the coolant control unit 87 performs a control so as to maintain the temperature of the first coolant and the temperature of the second coolant constant, in the same way as the spindle device of the comparative example. In the spindle device 10 of the present embodiment, the thermal expansion coefficient of the housing 12 and the thermal expansion coefficient of the rear housing 13 are larger than the thermal expansion coefficient of the spindle 14. That is, the thermal expansion coefficient of the bearing support part is larger than the thermal expansion coefficient of the spindle. When the temperature increases in the same amount, the expansion amount of the bearing support part is larger than the expansion amount of the spindle 14.

When the temperature of the bearings 16a, 16b, and 17 increases, the radial expansion amount of the bearing support part is larger than the radial expansion amount of the spindle 14. Thus, it is possible to suppress the increase in the pressure applied to the bearings 16a, 16b, and 17. The pressure applied to the bearings in the spindle device of which the material is changed is smaller than the pressure applied to the bearings in the spindle device of the comparative example. In particular, when the spindle 14 rotates at high speed, the increase in the pressure applied to the bearings 16a, 16b, and 17 can be suppressed. As a result, the bearings 16a, 16b, and 17 can be prevented from being damaged, and the life of the bearings 16a, 16b, and 17 can be prevented from being shortened.

The spindle device 10 of the present embodiment is suitable for an apparatus in which the bearings 16a, 16b, and 17 are secured to the housing 12 and the rear housing 13. For example, a spring for adjusting the pressure applied to the front bearing may be disposed inside the spindle device. In such a spindle device, when the temperature of the bearing increases, the increase in the pressure applied to the bearing can be suppressed by the spring. On the other hand, in the spindle device in which the bearing is secured to the bearing support part, the pressure applied to the bearing is likely to increase with the operation of the spindle device. Thus, the effect of the present invention is remarkable.

Referring to FIGS. 1 and 2, in the present embodiment, the temperature of the first coolant supplied to the housing 12 and the rear housing 13 can be adjusted by the first coolant supply device 41. The coolant control unit 87 can perform a first temperature control for changing the temperature of the coolant supplied to the first flow paths 21 to 23. Note that, in the present embodiment, the flow rate of the first coolant is controlled so as to be constant. However, the present invention is not limited to this embodiment, and the flow rate of the first coolant may be changed.

In the range where the rotational speed of the spindle motor 35 is low, the temperature of the coolant can be controlled so as to be the constant reference temperature Tr1 since the increase amount of the pressure received by the bearings is small. Referring to FIG. 4, in the first temperature control, the coolant control unit 87 performs a control for maintaining the temperature of the first coolant constant, independently of the rotational speed, in the range where the rotational speed of the spindle motor 35 is Nt or less. In this example, the temperature of the first coolant is maintained at the reference temperature Tr1. The rotational speed Nt is predetermined. The rotational speed Nt can be set to, for example, a rotational speed at which the bearings 16*a*, 16*b*, and 17 is liable to be damaged.

In the range where the rotational speed of the spindle motor 35 is larger than Nt, the coolant control unit 87 performs a control so that the temperature of the first coolant increases as the rotational speed of the spindle motor 35 increases. That is, the coolant control unit 87 can perform a control for enlarge the increase amount of temperature from the reference temperature Tr1 as the rotational speed of the spindle motor 35 increases. Thus, the first temperature control includes a control for increasing the temperature of the first coolant in accordance with the rotational speed of the spindle motor 35.

Referring to FIGS. 1, 2, and 4, the coolant control unit 87 of the spindle control unit 84 acquires the rotational speed of the spindle motor 35 (rotational speed of the spindle 14) from the spindle motor control unit 86. The coolant control unit 87 acquires the rotational speed of the operation command for the spindle motor 35 to be transmitted to the amplifier 94. Alternatively, the coolant control unit 87 may acquire the output value of the encoder 36. The coolant control unit 87 acquires the temperature of the first coolant from the first temperature sensor 43.

The coolant control unit 87 adjusts the temperature of the first coolant so that the temperature of the first coolant approaches a target temperature based on the rotational speed. The coolant control unit 87 controls the first coolant supply device 41. For example, in order to increase the temperature of the first coolant, the coolant control unit 87 can perform a control for reducing the cooling capacity of the first coolant supply device 41. Alternatively, the temperature of the first coolant may be increased by driving the heater.

In the range where the rotational speed is larger than Nt, the temperature of the housing 12 and the rear housing 13 can be increased by the first temperature control, as the rotational speed of the spindle motor 35 increases. The expansion amount of the housing 12 and the rear housing 13 can be increased.

FIG. 3 shows a graph of an example when the first temperature control is performed in the spindle device 10 of the present embodiment. In this example, in the range where the rotational speed is greater than Nt, a control is performed so as to maintain the temperature of the second coolant at the reference temperature Tr2 while changing the temperature of the first coolant. In the range where the rotational speed is larger than Nt, the expansion of the housing 12 and the rear housing 13 can be promoted. It can be seen that, with the first temperature control, the increase in the pressure applied to the bearings 16*a*, 16*b*, and 17 can be effectively suppressed in the range where the rotational speed is larger than Nt.

Referring to FIGS. 1 and 2, in the present embodiment, the temperature of the second coolant supplied to the spindle 14 can be adjusted by the second coolant supply device 42. The coolant control unit 87 can perform a second temperature control for changing the temperature of the coolant supplied to the second flow paths 25 and 26. Note that, in the present embodiment, the flow rate of the second coolant is controlled so as to be constant. However, the present invention is not limited to this embodiment, and the flow rate of the second coolant may be changed.

Referring to FIG. 5, in the second temperature control, the coolant control unit 87 performs a control for maintaining the temperature of the second coolant constant, independently of the rotational speed, in the range where the rotational speed of the spindle motor 35 is Nt or less. In this example, the target temperature of the second coolant is maintained at the reference temperature Tr2.

In the range where the rotational speed of the spindle motor 35 is larger than Nt, the coolant control unit 87 performs a control so that the temperature of the second coolant decreases as the rotational speed of the spindle motor 35 increases. That is, the coolant control unit 87 can perform a control for enlarging the decrease amount of temperature from the reference temperature Tr2 as the rotational speed of the spindle motor 35 increases. Thus, the second temperature control includes a control for reducing the temperature of the second coolant in accordance with the rotational speed of the spindle motor 35.

Referring to FIGS. 1, 2, and 5, the coolant control unit 87 acquires the temperature of the second coolant from the second temperature sensor 44. The coolant control unit 87 adjusts the temperature of the second coolant so that the temperature of the second coolant approaches the target temperature. The coolant control unit 87 controls the second coolant supply device 42. For example, in order to reduce the temperature of the second coolant, the coolant control unit 87 can perform a control for increasing the cooling capacity of the second coolant supply device 42.

FIG. 3 shows a graph of an example when the first temperature control and the second temperature control are performed in the spindle device 10 of the present embodiment. In this embodiment, in the range where the rotational speed is larger than Nt, the temperature of the first coolant is increased, and the temperature of the second coolant is decreased. The higher the rotational speed, the larger the difference between the temperature of the first coolant and the temperature of the second coolant. The expansion of the housing 12 and the rear housing 13 can be promoted in the range where the rotational speed is larger than Nt. Further, the expansion of the spindle 14 can be suppressed in the range where the rotational speed is larger than Nt. As a result, the increase in the pressure applied to the bearings 16*a*, 16*b*, and 17 can be effectively suppressed.

The spindle device 10 according to the present embodiment includes the first coolant supply device 41 and the second coolant supply device 42. However, the present invention is not limited to this embodiment. The spindle device can include at least one of the first coolant supply device and the second coolant supply device. The spindle device provided with the first coolant supply device can perform the first temperature control. The spindle device provided with the second coolant supply device can perform the second temperature control. Alternatively, the spindle device may not include the coolant supply device.

In the first temperature control and the second temperature control described above, the target temperature of the coolant is changed in the range where the rotational speed of the spindle motor 35 is larger than Nt. However, the present invention is not limited to this embodiment. The target temperature of the coolant can be changed in the range of any rotational speed. For example, in the first temperature control, the target temperature of the first coolant may be increased as the rotational speed increases in the range of all the rotational speeds. In the second temperature control, the target temperature of the second coolant may be reduced as the rotational speed increases in the range of all the rotational speeds.

Any type of rolling bearing can be adopted as the rolling bearing for supporting the spindle. For example, the rolling bearing such as an angular bearing and a roller bearing can be adopted.

The spindle device of the present embodiment holds a tool. However, the present invention is not limited to this embodiment. The spindle device may hold a workpiece. A lathe can be illustrated, as an example, as a machine tool in which the spindle device holds a workpiece. In the lathe, the spindle device can hold and rotate a workpiece while the movement device can move a tool relative to the workpiece.

The above embodiments can be combined as appropriate. In each figure described above, the same reference numerals are applied to the same or corresponding parts. The above embodiments are merely examples and does not limit the invention. Moreover, in the embodiments, the changes of the embodiment indicated in the claims are included.

REFERENCE SIGNS LIST 10 spindle device
12 housing
13 rear housing
14 spindle
16a, 16b, 17 bearing
18 tool
21, 23, 25, 26 flow path
35 spindle motor
36 encoder
41, 42 coolant supply device
43, 44 temperature sensor
82 control device
86 spindle motor control unit
87 coolant control unit

The invention claimed is:

1. A spindle device attached to a machine tool and rotates a tool or a workpiece, the spindle device comprising:
   a spindle for supporting the tool or the workpiece;
   a spindle motor for rotating the spindle;
   a rolling bearing having an inner ring, rolling elements, and an outer ring, the inner ring supporting the spindle;
   a bearing support part for securing the outer ring of the rolling bearing,
   a first coolant supply device for supplying a first coolant to the bearing support part; and
   a controller for controlling the first coolant supply device so as to adjust temperature of the first coolant supplied by the first coolant supply device; wherein
   the bearing support part is formed of a material having a thermal expansion coefficient larger than that of the spindle and has a first flow path through which the first coolant flows,
   the first flow path is disposed on the side of the outer ring of the rolling bearing,
   the first coolant supply device has a function of adjusting the temperature of the first coolant and supplies the first coolant to the first flow path, and
   the controller performs a control for maintaining the temperature of the first coolant constant when a rotational speed of the spindle motor is equal to or less than a predetermined determination value, and a control for increasing the temperature of the first coolant as the rotational speed of the spindle motor increases when the rotational speed of the spindle motor is greater than the determination value.

2. A spindle device attached to a machine tool and rotates a tool or a workpiece, the spindle device comprising:
   a spindle for supporting the tool or the workpiece;
   a spindle motor for rotating the spindle;
   a rolling bearing having an inner ring, rolling elements, and an outer ring, the inner ring supporting the spindle;
   a bearing support part for securing the outer ring of the rolling bearing,
   a second coolant supply device for supplying a second coolant to the spindle; and
   the controller for controlling the second coolant supply device so as to adjust temperature of the second coolant supplied by the second coolant supply device; wherein
   the bearing support part is formed of a material having a thermal expansion coefficient larger than that of the spindle,
   the spindle has a second flow path through which the second coolant flows,
   the second flow path is disposed on the side of the inner ring of the rolling bearing,
   the second coolant supply device has a function of adjusting the temperature of the second coolant and supplies the second coolant to the second flow path,
   the controller performs a control for maintaining the temperature of the second coolant constant when the rotational speed of the spindle motor is equal to or less than the determination value, and a control for reducing the temperature of the second coolant as the rotational speed of the spindle motor increases when the rotational speed of the spindle motor is greater than the determination value.

* * * * *